(12) United States Patent
Odaka et al.

(10) Patent No.: US 8,481,788 B2
(45) Date of Patent: Jul. 9, 2013

(54) PROCESS FOR PRODUCING POLYALKYLENE OXIDE

(75) Inventors: Hidetoshi Odaka, Hyogo (JP); Takuya Maeda, Hyogo (JP); Kiyotaka Bito, Hyogo (JP); Michihide Homma, Hyogo (JP)

(73) Assignee: Kaneka Corporation, Osaka (JP)

( * ) Notice: Subject to any disclaimer, the term of this patent is extended or adjusted under 35 U.S.C. 154(b) by 357 days.

(21) Appl. No.: 12/863,919

(22) PCT Filed: Jan. 21, 2009

(86) PCT No.: PCT/JP2009/050851
§ 371 (c)(1),
(2), (4) Date: Oct. 5, 2010

(87) PCT Pub. No.: WO2009/093599
PCT Pub. Date: Jul. 30, 2009

(65) Prior Publication Data
US 2011/0028682 A1 Feb. 3, 2011

(30) Foreign Application Priority Data
Jan. 25, 2008 (JP) ................................. 2008-015340

(51) Int. Cl.
*C07C 213/00* (2006.01)
(52) U.S. Cl.
USPC ........... 564/505; 564/504; 568/623; 568/624; 568/617; 521/180; 679/620; 528/405; 528/272; 524/35

(58) Field of Classification Search
USPC ... 564/505, 504; 568/623, 624, 617; 521/180; 679/620; 528/405, 272; 524/35
See application file for complete search history.

(56) References Cited

FOREIGN PATENT DOCUMENTS

| | | |
|---|---|---|
| EP | 1 870 425 | 12/2007 |
| JP | 2-265903 | 10/1990 |
| JP | 3-47825 | 2/1991 |
| JP | 3-72527 | 3/1991 |
| JP | 3-195727 | 8/1991 |
| JP | 4-59825 | 2/1992 |
| JP | 2001-525878 | 12/2001 |
| JP | 2004-051996 | 2/2004 |
| JP | 2006-009037 | * 1/2006 |
| WO | 02/066528 | 8/2002 |

* cited by examiner

*Primary Examiner* — Shane Fang
(74) *Attorney, Agent, or Firm* — Hamre, Schumann, Mueller & Larson, P.C.

(57) ABSTRACT

The present invention aims to provide a method for producing a polyalkylene oxide, which is capable of improving reduction in reactivity of a double metal cyanide complex catalyst in the case that a low molecular weight initiator is used, and producing the polyalkylene oxide with high productivity at low cost. The method for producing a polyalkylene oxide comprises carrying out a ring-opening addition reaction of an alkylene oxide with an initiator having at least one hydroxy group and having a molecular weight of not more than 300 per hydroxy group in the presence of a double metal cyanide complex catalyst in an organic solvent, wherein the organic solvent is used in an amount of 500 to 1,500 parts by weight relative to 100 parts by weight of the alkylene oxide used at the start of the reaction.

13 Claims, No Drawings

PROCESS FOR PRODUCING POLYALKYLENE OXIDE

TECHNICAL FIELD

The present invention relates to a method for producing a polyalkylene oxide.

BACKGROUND ART

Polyalkylene oxides prepared by ring-opening polymerization of monoepoxides such as alkylene oxides with initiators have been commonly used as raw materials for sealing materials, adhesives and the like because such polyalkylene oxides are liquid at room temperature and after being cured, remain flexible even at comparatively low temperatures. For example, polyalkylene oxides used for sealing materials and adhesives are moisture-curing compounds having hydrolyzable silicon group(s) at end(s) (see, for example, Patent Documents 1 and 2).

Polyalkylene oxides are synthesized from initiators having active hydrogen group(s) such as hydroxy group(s) at end(s) which are polymerized in the presence of catalysts such as alkali metal catalysts, metal porphyrin catalysts, double metal cyanide complex catalysts, and P=N bond-containing compound catalysts. Particularly, the double metal cyanide complex catalysts are commonly used for the production of polyalkylene oxides, especially in the case that propylene oxide is used as an alkylene oxide. This is because the use of such double metal cyanide complex catalysts reduces the production of unsaturated mono-ols as by-products of polymerization and therefore results in the production of polyalkylene oxides having a high molecular weight and a narrow molecular weight distribution, which cannot be produced by alkali metal catalysts.

When a double metal cyanide complex catalyst is used for the production of polyalkylene oxides, the polymerization activity of the double metal cyanide complex catalyst should be activated by heating a certain amount of an alkylene oxide together with an initiator in the presence of the double metal cyanide complex catalyst. In the context of the present description, the step including heating in the presence of a certain amount of an alkylene oxide is referred to as a "batch reaction". On the other hand, a step including continuously supplying an alkylene oxide is differently referred to as an "adding reaction". Hereinafter, the step of activating the polymerization activity of a double metal cyanide complex catalyst is referred to as "activation of the catalyst by the batch reaction".

If an alkylene oxide is continuously supplied without the batch reaction, which is a step of activating the polymerization activity of the catalyst, polymerization of the alkylene oxide does not proceed. As a result, a large amount of the alkylene oxide remains unreacted and accumulates in the reactor. As is acknowledged, the concentration of the alkylene oxide strongly influences activation of the polymerization activity of the catalyst. The reactor in which the alkylene oxide has accumulated to a high concentration is in danger of rapid progress of the reaction, that is, explosive polymerization of a large amount of the alkylene oxide. The explosive polymerization of a large amount of the alkylene oxide rapidly generates heat, which is accompanied with an increase in the internal temperature. The temperature increase in turn increases the vapor pressure of the alkylene oxide, and these factors may lead to a rapid increase in the internal pressure in a reactor and thus to troubles such as breakage of the reactor.

However, once being activated, the double metal cyanide complex catalyst enables smooth polymerization and smooth consumption of the alkylene oxide continuously supplied after the activation. In this case, dangerous excessive accumulation of the alkylene oxide is avoidable. Accordingly, when a double metal cyanide complex catalyst is used for the production of polyalkylene oxides, it is important, for the safety reason, to activate the double metal cyanide complex catalyst by the batch reaction and induce the polymerization activity before continuous supply of an alkylene oxide. However, low molecular weight initiators cause some problems. For example, the use of a low molecular weight initiator does not allow the batch reaction to proceed, or allows the batch reaction to proceed but at a remarkably slow rate and requires a longer time for activation of the catalyst by the batch reaction. To overcome the problems, a technique has been developed in which a mixed initiator including a first initiator having a comparatively low molecular weight and a second initiator having a comparatively high molecular weight is used so that the initiator having a low molecular weight is allowed to react (see Patent Document 3). Another technique has also been disclosed in which a first initiator having a comparatively high molecular weight is reacted with an alkylene oxide to yield an activated initiator in advance, a mixed initiator is prepared by mixing a second initiator having a comparatively low molecular weight with the activated initiator, and the mixed initiator is used so that the initiator having a low molecular weight is allowed to react (see Patent Document 4). In these techniques of producing polyalkylene oxides, the reactions may be carried out in an organic solvent such as tetrahydrofuran, as are described in, for example, Patent Documents 3, 4, and 5. However, no previous studies have provided sufficient data to discuss effects of the amount of an organic solvent on activation of the catalyst by the batch reaction when only a low molecular weight initiator is used for the production of polyalkylene oxides.

Patent Document 1: JP-A H03-72527
Patent Document 2: JP-A H03-47825
Patent Document 3: JP-A H04-59825
Patent Document 4: JP-A 2004-51996
Patent Document 5: JP-A H02-265903

SUMMARY OF THE INVENTION

In view of the above-mentioned problems, an object of the present invention is to provide a method for producing a polyalkylene oxide which includes activating a double metal cyanide complex catalyst only with a low-molecular weight initiator such that polyalkylene oxides with a high molecular weight and monodispersity are provided.

The present inventors have intensively studied to overcome the above-mentioned problems, and completed the present invention with the following findings:

The use of an organic solvent in the reaction enables activation of a double metal cyanide complex catalyst without using a high molecular weight initiator;

For activation of the catalyst, a low molecular weight initiator is preferably present at a low concentration in the batch reaction at the start of the reaction because the low molecular weight initiator deactivates the catalyst;

An advantageous way to activate the catalyst is that the low molecular weight initiator is used in a small amount at the start of the reaction, and after the activation of the catalyst, the rest of the initiator is added in the second or later batch reaction";

For safety, the organic solvent is used in an amount of 500 to 1,500 parts by weight relative to 100 parts by weight of the alkylene oxide used at the start of the reaction because the use of the organic solvent in an amount within this range effectively removes heat generated by polymerization in the initial stage of the reaction;

The concentration of the catalyst at the start of the reaction is preferably not less than 2,000 ppm for activation of the catalyst; and For safety in the second or later batch reactions, the alkylene oxide should be added in an amount not less than 100 mol equivalent to the initiator after the batch reaction at the start of the reaction and allowed to react (first adding reaction) so that the volume of the system is increased and cooling efficiency is improved.

More specifically, the present invention provides:

(I) a method for producing a polyalkylene oxide, comprising carrying out a ring-opening addition reaction of an alkylene oxide with an initiator having at least one hydroxy group and having a molecular weight of not more than 300 per hydroxy group in the presence of a double metal cyanide complex catalyst in an organic solvent, wherein a batch reaction is performed using the organic solvent in an amount of 500 to 1,500 parts by weight relative to 100 parts by weight of the alkylene oxide used at the start of the reaction;

(II) the method for producing a polyalkylene oxide according to (I), wherein the organic solvent is a non active hydrogen polar compound;

(III) the method for producing a polyalkylene oxide according to (I) or (II), wherein the organic solvent is selected from the group consisting of heterocyclic compounds and acyclic ethers;

(IV) the method for producing a polyalkylene oxide according to any one of (I) to (III), wherein the initiator is added in two or more portions, and the batch reaction is performed after every addition of the initiator;

(V) the method for producing a polyalkylene oxide according to (IV), wherein the initiator is added in portions and used, at the start of the reaction, in an amount of not more than 20% by weight to the total amount of the initiator;

(VI) the method for producing a polyalkylene oxide according to any one of (I) to (V), wherein the catalyst is present at a concentration of not less than 2,000 ppm in the batch reaction at the start of the reaction;

(VII) the method for producing a polyalkylene oxide according to anyone of (I) to (VI), wherein the organic solvent is used in an amount of not less than 1,000 parts by weight relative to 100 parts by weight of the initiator used in the batch reaction at the start of the reaction;

(VIII) the method for producing a polyalkylene oxide according to anyone of (IV) to (VII), wherein the alkylene oxide is added in an amount not less than 100 mol equivalent to the initiator used in the batch reaction at the start of the reaction and polymerized, and then an additional portion of the initiator is added;

(IX) the method for producing a polyalkylene oxide according to any one of (I) to (VIII), wherein after the batch reaction, an adding reaction is performed in which the alkylene oxide is additionally added;

(X) the method for producing a polyalkylene oxide according to (IX), wherein all the rest of the alkylene oxide is additionally added in the adding reaction after the total amount of the initiator is batchwise added;

(XI) the method for producing a polyalkylene oxide according to any one of (I) to (X), wherein the initiator has a molecular weight of not more than 150 per hydroxy group; and (XII) the method for producing a polyalkylene oxide according to any one of (I) to (XI), wherein the resulting polyalkylene oxide has a number average molecular weight of not less than 10,000.

The production method of the present invention is advantageous in terms of cost because a low-cost initiator having a low molecular weight is only used without a high molecular weight initiator, that is, because the material cost for polyalkylene oxides is reduced. In addition, the production method of the present invention is suitable for mass production and reduces process cost because polyalkylene oxides are produced under mild conditions in a safe manner. Polyalkylene oxides produced by the production method of the present invention have a narrow molecular weight distribution and are suitably used as raw materials for various industrial products.

BEST MODE FOR CARRYING OUT THE INVENTION

The present invention relates to a method for producing a polyalkylene oxide, including carrying out a ring-opening addition reaction of an alkylene oxide with an initiator having at least one hydroxy group and having a molecular weight of not more than 300 per hydroxy group in the presence of a double metal cyanide complex catalyst in an organic solvent. Hereinafter, materials and reaction conditions of the method of the present invention are described.

<Double Metal Cyanide Complex Catalyst>

Polyalkylene oxides are commonly produced by polymerizing alkylene oxides with initiators such as hydroxy compounds having at least one hydroxy group in the presence of catalysts such as alkali metal catalysts, metal porphyrin catalysts (see, for example, JP-A S61-197631 and JP-A S61-197631), double metal cyanide complex catalysts (see, for example, U.S. Pat. No. 3,278,457, U.S. Pat. No. 3,278,458, U.S. Pat. No. 3,278,459, U.S. Pat. No. 3,427,256, U.S. Pat. No. 4,721,818, and Macromol. Syn., 5, 9 (1974)), P=N bond-containing compound catalysts (see, for example, JP-A H11-106500, JP-A H10-36499, and JP-A H11-302371). The double metal cyanide complex catalysts and P=N bond-containing compound catalysts are preferable among these catalysts because they provide high molecular weight, colorless polyalkylene oxides, and particularly, the double metal cyanide complex catalysts are preferable, as is known in the art.

Double metal cyanide complex catalysts used in the present invention are considered to have a structure of the following Formula (1) like the conventional ones described above.

$$M^1_a[M^2_x(CN)_y]_b(H_2O)_c R^1_d \qquad \text{Formula (1)}$$

[In Formula (1), $M^1$ is a metal ion such as Zn(II), Fe(II), Fe(III), Co(II), Ni(II), Al(III), Sr(II), Mn(II), Cr(III), Cu(II), Sn(II), Pb(II), Mo(IV), Mo(VI), W(IV), and W(VI); $M^2$ is a metal ion such as Fe(II), Fe(III), Co(II), Co(III), Cr(II), Cr(III), Mn(II), Mn(III), Ni(II), V(IV), and V(V); $R^1$ is an organic ligand; a, b, x, and y are positive integers that vary with the valences and the coordination numbers of the metals; and c and d are positive numbers that vary with the coordination numbers of the metals.]

For high catalyst activity, $M^1$ is preferably Zn(II) and $M^2$ is preferably Fe(II), Fe(III), Co(II), Co(III), or the like in the double metal cyanide complex catalysts represented by the Formula (1). Particularly, zinc hexacyanocobaltate complexes are preferable. A zinc hexacyanocobaltate complex may be used in combination with other double metal cyanide complexes. Double metal cyanide complexes having different metal components may be used in combination, or two or more of complex catalysts may be used in combination.

The organic ligand $R^1$ may be, for example, a ketone, an ether, an aldehyde, an ester, an alcohol, an amide, a nitril, or a sulfide. The organic ligand is preferably an alcohol or an ether. The organic ligand is preferably one or more selected from alcohols such as tert-butyl alcohol, compounds represented by the following Formula (2), ethanol, sec-butyl alcohol, n-butyl alcohol, isobutyl alcohol, tert-pentyl alcohol, isopentyl alcohol, and isopropyl alcohol; and ethers such as ethylene glycol dimethyl ether (hereinafter, referred to as glyme), diethylene glycol dimethyl ether (hereinafter, referred to as diglyme), triethylene glycol dimethyl ether (hereinafter, referred to as triglyme), dioxanes and polyethers having a molecular weight of 150 to 5,000. Particularly, one or more selected from tert-butyl alcohol, the compounds represented by Formula (2), and glyme are preferable among these.

$$R^2\text{—}C(CH_3)_2(OR^3)_n OH \qquad \text{Formula (2)}$$

[In Formula (2), $R^2$ is a methyl group or an ethyl group; $R^3$ is an ethylene group or a group in which a hydrogen atom of the ethylene group is substituted by a methyl group or an ethyl group; and n is 1, 2, or 3.]

Examples of the compounds represented by Formula (2) include ethylene glycol mono-tert-butyl ether, propylene glycol mono-tert-butyl ether, ethylene glycol mono-tert-pentyl ether, and propylene glycol mono-tert-pentyl ether.

The double metal cyanide complex catalysts represented by Formula (1) can be prepared as follows: mixing solutions of a metal salt and of a polycyano metalate (salt) in water or a mixed solvent of water and an organic solvent; allowing the organic ligand $R^1$ to contact the resulting double metal cyanide and stirring and maturing the resulting double metal cyanide in the organic ligand; and conducting filtration, washing and drying in a known manner. The metal salt is represented by the formula $M^1 Y_g$ in which $M^1$ is defined as above; Y is an anion that forms a salt with $M^1$; and g is a positive integer that varies with the valence of the metal. The polycyano metalate (salt) is represented by the formula $Z_e[M^2_x(CN)_y]_f$ in which $M^2$, x, and y are defined as above; Z is hydrogen, an alkali metal, an alkaline-earth metal or the like; and e and f are positive integers determined by the valences and the coordination numbers of Z and $M^2$.

The polycyano metalate (salt) $Z_e[M^2_x(CN)_y]_f$ is preferably a lithium salt, a sodium salt, a potassium salt, a magnesium salt, or a calcium salt although Z may be hydrogen, or any metal selected from various metals including alkali metals. Particularly, the polycyano metalate (salt) is preferably a common alkali metal salt, that is, a sodium salt or a potassium salt. The metal in the cyanometalate of the polycyano metalate (salt) is preferably Co(III) or Fe(III), and especially preferably Co(III). Particularly, potassium hexacyanocobaltate is preferable among alkali metal cyanometalates.

The metal salt $M^1 Y_g$ is preferably a metal halide. The metal therein is preferably Zn(II) or Fe(II), and especially preferably Zn(II). Particularly, zinc chloride is preferable among metal halides.

Such a double metal cyanide complex catalyst is preferably used at a concentration of not less than 2,000 ppm at the start of the reaction, more preferably not less than 2,400 ppm, and especially preferably not less than 2,800 ppm in terms of reduction in the time required for activation of the catalyst by the batch reaction and quality stability of polyalkylene oxides to be obtained. The catalyst may be added portion by portion or all at once.

<Organic Solvent>

The organic solvent used for the production of polyalkylene oxides in the present invention is not particularly limited, provided that it is free from active hydrogen and inactive in polymerization. Examples thereof include polar compounds such as aromatic compounds including benzene, monochlorobenzene, toluene, ethylbenzene, styrene, and o-, m-, and p-xylenes; heterocyclic compounds including tetrahydrofuran, dioxanes, furan, and pyran, and acyclic ethers including butyl ethyl ether. The polar compounds such as heterocyclic compounds and acyclic ethers are preferable among these because they improve the polymerization activity of the double metal cyanide complex catalyst in the batch reaction and achieve monodispersity of the molecular weight distribution of the resulting polyalkylene oxides. Among these, tetrahydrofuran, dioxanes, and butyl ethyl ether are preferable, and tetrahydrofuran is particularly preferable. The use of the organic solvent produces strikingly advantageous effects such as smooth activation of the catalyst by the batch reaction especially when a low molecular weight initiator whose polymerization activity is low is used. Any of the above-mentioned organic solvents may be used alone, or two or more of these may be used in combination.

The amount of the organic solvent is from 500 parts by weight to 1,500 parts by weight relative to 100 parts by weight of the alkylene oxide used in the batch reaction at the start of the reaction, and particularly preferably from 750 parts by weight to 1,250 parts by weight. The organic solvent in an amount within the above-mentioned range prevents temperature increase and pressure increase caused in the batch reaction at the start of the reaction, and allows the batch reaction to be performed in a safe manner. Less than 500 parts by weight of the organic solvent fails to effectively remove heat generated by polymerization and therefore is disadvantageous in terms of safety. Even less than 500 parts by weight of the organic solvent can initiate the reaction if a large amount of the alkylene oxide is used. In this case, however, disadvantageously the internal temperature of the reactor will rapidly increase. More than 1,500 parts by weight of the organic solvent is excessive and disadvantageous in terms of cost. In the present invention, the organic solvent may be removed by evaporation after the production of polyalkylene oxides, or may not be removed and remain to serve as a solvent in the following reaction.

The amount of the organic solvent is preferably not less than 1,000 parts by weight relative to 100 parts by weight of the initiator used in the batch reaction at the start of the reaction, and more preferably not less than 3,000 parts by weight. Undesirably, less than 1,000 parts by weight of the organic solvent is less likely to induce activation of the catalyst due to high initiator concentration.

<Initiator>

The initiator used in the present invention is not particularly limited, provided that it is an active-hydrogen-containing compound having at least one hydroxy group and having a molecular weight of not more than 300 per hydroxy group. Examples of the initiator include: monovalent primary, secondary and tertiary alcohols such as methanol, ethanol, propanol, butanol, pentanol, hexanol, heptanol, octanol, nonanol, and decanol; monovalent unsaturated group-containing alcohols such as allyl alcohol, metallyl alcohol, and propenyl alcohol; monovalent unsaturated group-containing alcohols such as monoallyletherified compounds of diols (such as ethylene glycol, diethylene glycol, propylene glycol, dipropylene glycol, 1,3-propanediol, neopentyl glycol, 1,4-butanediol, 1,5-pentanediol, 1,6-hexanediol, and 1,4-cyclohexanediol) and monovinyletherified compounds of the diols, and monovalent saturated alcohols such as monoalkyletherified compounds of the diols; polyvalent alcohols such as ethylene glycol, diethylene glycol, propylene glycol, dipropylene glycol, 1,3-propanediol, neopentyl glycol, 1,4-butanediol, 1,5-pentanediol, 1,6-hexanediol, 1,4-cyclohexanediol, glycerin, diglycerin, trimethylolpropane, pentaerythritol, glucose, sorbitol, sucrose, and methyl glycoside; alkanolamines such as monoethanolamine, diethanolamine, and triethanolamine; phenol compounds such as bisphenol A, bisphenol F, bisphenol S, resorcin, and hydroquinone; and polyvalent alcohols obtainable by addition reaction of the above compounds usable as the initiator with alkylene oxides having molecular weights of not more than 300 per hydroxy group. The molecular weight of the initiator is not more than 300 per hydroxy group, and preferably not more than 150 per hydroxy group. Initiators having molecular weights of more than 300 per hydroxy group are disadvantageous in terms of cost because such initiators are expensive and are required in a larger amount to produce a polyalkylene oxide having a certain molecular weight as compared to low molecular weight initiators. Any of these initiators may be used alone, or two or more of these may be used in combination.

The amount of the initiator used in the present invention is not particularly limited, and may be determined from the molecular weight of a target polyalkylene oxide to be produced. The initiator may be added in any manner but is preferably added in portions instead of being added all at once in order to smoothly activate the catalyst by the batch reaction. The number of portions is not particularly limited, provided that it is two or more. However, the initiator is preferably added in two to ten portions, more preferably two to five portions, particularly preferably two or three portions, and most preferably two portions for the efficiency of addition. The amount of the initiator added at the start of the reaction is preferably a proportion of not more than 20% by weight of the total amount of the initiator used, more preferably not more than 15% by weight, and particularly preferably not more than 10% by weight for smooth activation of the catalyst by the batch reaction. Undesirably, the use of the initiator in an amount of more than 20% by weight at the start of the reaction is less likely to induce activation of the catalyst due to high initiator concentration in the system. In the case that the initiator is added in portions, it is important for safety to perform the batch reaction after every addition of the initiator. The second portion of the initiator is preferably added after addition of the alkylene oxide in an amount of not less than 100 mol equivalent to the initiator added at the start of the reaction, more preferably not less than 150 mol equivalent, and particularly preferably not less than 200 mol equivalent. After the second addition of the initiator, the polymerization activity of the catalyst becomes low again and then the catalyst is activated by the batch reaction again. In this reaction, the above-mentioned addition timing produces preferable effects because heat generated by polymerization in the second batch reaction is absorbed by the heat capacity of polyalkylene oxides polymerized with the initiator added at the start of the reaction, and rapid temperature increase is prevented.

<Alkylene Oxide>

The alkylene oxide is not particularly limited, and examples thereof include ethylene oxide, propylene oxide, 1,2-butylene oxide, 2,3-butylene oxide, isobutylene oxide, epichlorohydrin, epibromohydrin, methyl glycidyl ether, allyl glycidyl ether, butyl glycidyl ether, 2-ethylhexylene glycidyl ether, and trifluoropropylene oxide. Any of these may be used alone, or two or more of these may be used in combination. Among these, propylene oxide is particularly preferable in terms of polymerization activity.

As described above, considering safety, the double metal cyanide complex catalyst should be activated by the batch reaction in which the catalyst is heated together with a certain amount of the alkylene oxide before continuous supply of the alkylene oxide, when the double metal cyanide complex catalyst is used for the production of polyalkylene oxides. If too little alkylene oxide is used for activation of the catalyst by the batch reaction, it will take a longer time for activation of the catalyst by the batch reaction, which is disadvantageous in terms of productivity. On the other hand, if too much alkylene oxide is used, explosive polymerization will occur and cause safety risks such as abnormal internal temperature increase and internal pressure increase. Accordingly, it is important that the double metal cyanide complex catalyst is activated by the batch reaction using the alkylene oxide in an amount that causes no problems in productivity and safety when the double metal cyanide complex catalyst is used for the production of polyalkylene oxides.

<Reaction Condition in Present Invention>

The reaction conditions in the present invention are described based on an exemplary case where the initiator is added in two or more portions. However, the initiator is not required to be added in portions in the present invention.

<Condition in Batch Reaction at Start of Reaction>

The temperature in the batch reaction performed at the start of the reaction is not particularly limited, and is preferably 70° C. to 110° C., and particularly preferably 80° C. to 100° C. in terms of safe activation of the catalyst. The reaction time of the batch reaction is not particularly limited. The start of polymerization can be monitored by an increase in the internal temperature of the reactor and a decrease in the internal pressure of the reactor, and consumption of the alkylene oxide can be monitored by stability of the internal pressure. Considering safety and productivity, the time of the batch reaction at the start of the reaction is preferably 30 minutes to 90 minutes. This reaction is preferably performed in an inert gas atmosphere such as nitrogen or argon because deterioration of polyalkylene oxides caused by oxidization can be reduced in such an atmosphere.

<Condition of First Adding Reaction>

Preferably, in the present invention, the alkylene oxide is additionally added and allowed to react after the batch reaction at the start of the reaction, and this reaction step is referred to as a first adding reaction. This reaction increases the volume of the system and enables effective removal of heat generated by polymerization in the second batch reaction although this reaction may not be performed. The amount of the alkylene oxide additionally added is preferably not less than 100 mol equivalent to the initiator added at the start of the reaction, more preferably not less than 150 mol equivalent, and particularly preferably not less than 200 mol equivalent. The reaction temperature is not particularly limited, and is preferably 100° C. to 150° C., and particularly preferably 110° C. to 140° C. in terms of narrower molecular weight distribution of the resulting polymer product. The alkylene oxide may be added over a time as short or long as needed, but preferably added over 1 hour to 4 hours. Addition over more than 4 hours disadvantageously elongates the reaction time. On the other hand, addition over less than 1 hour disadvantageously causes a rapid increase in the internal temperature of the reactor.

<Condition of Second or Later Batch Reaction>

In the case that a low molecular weight initiator is added in portions, the batch reaction performed for at least the second time after the batch reaction at the start of the reaction is referred to as the second or later batch reaction. This reaction may not be performed but is preferably performed, and more preferably performed after the first adding reaction. In this reaction, a portion of the low molecular weight initiator that has not been used in the batch reaction at the start of the reaction is added to the reactor and reacted with the alkylene oxide. The conditions of the reaction between the initiator and the alkylene oxide are milder than those in the batch reaction at the start of the reaction because the catalyst has already been activated in the batch reaction at the start of the reaction. In the second or later batch reaction, the temperature is not particularly limited, and is preferably 70° C. to 110° C., and particularly preferably 80° C. to 100° C. Considering safety and productivity, the time of this reaction is preferably 30 minutes to 3 hours. In the case that the batch reaction is performed three or more times, the adding reaction in which the alkylene oxide is additionally added may be performed between one and another of the batch reactions.

<Condition of Last Adding Reaction>

The last adding reaction in the present invention is not particularly limited, and is a reaction in which the rest of the alkylene oxide is all added after addition of the whole amount of the initiator in the batch reactions. In this reaction, the rest of the alkylene oxide which has not been used in the batch reaction at the start of the reaction, the first adding reaction, and the second or later batch reactions is added to increase the molecular weight of the resulting polyalkylene oxides. The alkylene oxide may be added over a time as short or long as needed, but preferably added over 5 hours to 10 hours. Addition over more than 10 hours disadvantageously elongates the reaction time. On the other hand, addition over less than 5 hours disadvantageously causes a rapid increase in the internal temperature of the reactor. The reaction temperature is not particularly limited, and is preferably 100° C. to 150° C., and particularly preferably 110° C. to 140° C. in terms of narrower molecular weight distribution of the resulting polymer product. In order to produce polyalkylene oxides having high molecular weights, a larger amount of the alkylene oxide is required. Therefore, a reactor having a large capacity is preferably used for the reaction. Alternatively, the reaction solution may be transferred to a larger reactor during the polymerization reaction process, and then the last adding reaction may be performed in the larger reactor.

The resulting polyalkylene oxides preferably have a number average molecular weight (Mn) of not less than 3,000 per active hydrogen group. Polyalkylene oxides having a number average molecular weight of less than 3,000 are not preferable because they are not suitable as raw materials for sealing materials and adhesives. The number average molecular weight is more preferably not less than 4,000, and particularly preferably not less than 6,000. In usages that require high elongation, the number average molecular weight is preferably not less than 7,000, more preferably not less than 8,000, and particularly preferably not less than 10,000. The number average molecular weight used herein refers to a polystyrene equivalent number average molecular weight determined by gel permeation chromatography (GPC) at 40° C. using tetrahydrofuran as a solvent.

In the production method of the present invention, the organic solvent is used to improve the catalyst activity and suppress the side reaction. Therefore, the production method of the present invention favorably controls the molecular weights of polymerized polyalkylene oxides such that the polyalkylene oxides have a narrow molecular weight distribution. The molecular weight distribution (Mw/Mn: weight average molecular weight/number average molecular weight) of the polymers is not particularly limited, and is preferably not more than 1.50, and more preferably not more than 1.35. Polyalkylene oxides having a narrow molecular weight distribution are suitably used as raw materials for sealing materials and adhesives.

EXAMPLES

Hereinafter, the present invention is described in detail based on examples, but is not limited only to these examples. In the following, Mn and Mw/Mn are a polystyrene equivalent number average molecular weight and molecular weight distribution determined by gel permeation chromatography (GPC) at 40° C. using tetrahydrofuran as a solvent. A zinc hexacyanocobaltate complex used in the following examples and comparative examples was synthesized in conformity with the synthesis method described in Macromolecular Syntheses, Vol. 5, p 9 (1974). Specifically, an aqueous solution of potassium hexacyanocobaltate was allowed to pass through a cation-exchange resin, and the obtained solution was stirred and mixed with a zinc chloride aqueous solution. Glyme was further added as an organic ligand, and the resulting mixture was separated by filtration. The residue was washed and dried to provide the zinc hexacyanocobaltate complex.

Example 1

An amount of 24.9 g of dipropylene glycol (molecular weight: 134), 765 g of tetrahydrofuran, and 2.6 g of zinc hexacyanocobaltate complex dispersed in a portion of the tetrahydrofuran were charged in a 10-L autoclave made of stainless steel. An amount of 74.6 g of propylene oxide was further added thereto, and the mixture was heated so that the batch reaction was performed at 90° C. After about 50 minutes from the heating, the start of the batch reaction was marked by a temperature increase and a pressure decrease, which were caused by polymerization. Subsequently, 1,928 g of propylene oxide was added in a continuous manner so that the adding reaction was performed at 110° C. for 2.5 hours. The reactor was cooled to a temperature of 50° C. or lower, and 282.1 g of dipropylene glycol and 345.2 g of propylene oxide were added in this order. The resulting mixture was heated so that the second batch reaction was performed at 90° C. for 2 hours. The start of the batch reaction was marked by a temperature increase and a pressure decrease, which were caused by polymerization. Subsequently, 1,577 g of propylene oxide was added in a continuous manner so that the adding reaction was performed at 135° C. for 1 hour. Then, the internal temperature was controlled to 90° C., and a portion (3,776 g) of the polymerized product was taken out. Thereafter, 5,184 g of propylene oxide was added in a continuous manner so that the adding reaction was performed at 135° C. for 6 hours. Consequently, polyalkylene oxides having an Mn of 13,900 and an Mw/Mn of 1.17 were produced.

Example 2

An amount of 0.9 g of dipropylene glycol (Mn: 134), 31.9 g of tetrahydrofuran, and 0.25 g of zinc hexacyanocobaltate complex dispersed in a portion of the tetrahydrofuran were charged in a 3-L autoclave made of stainless steel. An amount of 3.3 g of propylene oxide was further added thereto, and the mixture was heated so that the batch reaction was performed at 90° C. After about 50 minutes from the heating, a temperature increase and a pressure decrease caused by polymerization were observed. Subsequently, 80.7 g of propylene oxide was added in a continuous manner so that the adding reaction was performed at 110° C. for 60 minutes. Then, the reactor was cooled to a temperature of 50° C. or lower, and 21.5 g of dipropylene glycol and 28.0 g of propylene oxide were added in this order. The resulting mixture was heated so that the second batch reaction was performed at 90° C. for 60 minutes. The start of the batch reaction was marked by a temperature increase and a pressure decrease, which were caused by polymerization. Thereafter, 1,988 g of propylene oxide was added in a continuous manner so that the adding reaction was performed at 135° C. for 5 hours. Consequently, polyalkylene oxides having an Mn of 15,700 and an Mw/Mn of 1.21 were produced.

Example 3

An amount of 24.6 g of polypropylene triol (molecular weight determined from hydroxy value: 306), 746 g of tetrahydrofuran, and 3.1 g of zinc hexacyanocobaltate complex dispersed in a portion of the tetrahydrofuran were charged in a 10-L autoclave made of stainless steel. An amount of 74.6 g of propylene oxide was further added thereto, and the mixture was heated so that the batch reaction was performed at 90° C. After about 50 minutes from the heating, the start of the batch reaction was marked by a temperature increase and a pressure decrease, which were caused by polymerization. Subsequently, 2,062 g of propylene oxide was added in a continuous manner so that the adding reaction was performed at 110° C. for 3 hours. The reactor was cooled to a temperature of 50° C. or lower, and 258.4 g of polypropylene triol same as above and 258.1 g of propylene oxide were added in this order. The resulting mixture was heated so that the second batch reaction was performed at 90° C. for 1.5 hours. The start of the batch reaction was marked by a temperature increase and a pressure decrease, which were caused by polymerization. Then, the internal temperature was controlled to 90° C., and a portion (2,799 g) of the polymerized product was taken out. Thereafter, 4,426 g of propylene oxide was added in a continuous manner so that the adding reaction was performed at 135° C. for 6 hours. Consequently, polyalkylene oxides having an Mn of 26,600 and an Mw/Mn of 1.3 were produced.

Example 4

An amount of 11.2 g of dipropylene glycol (Mn: 134), 200 g of tetrahydrofuran, and 0.64 g of zinc hexacyanocobaltate complex dispersed in a portion of the tetrahydrofuran were charged in a 3-L autoclave made of stainless steel. An amount of 14.0 g of propylene oxide was further added thereto, and the mixture was heated so that the batch reaction was performed at 90° C. A temperature increase and a pressure decrease caused by polymerization were observed after about 1.5 hours from the heating, and then after about 60 minutes, the pressure stopped decreasing and became stable. Then, the reactor was cooled to a temperature of 50° C., and 11.2 g of dipropylene glycol and 14.0 g of propylene oxide were added in this order. The resulting mixture was heated so that the second batch reaction was performed at 90° C. The start of polymerization was marked by a temperature increase and a pressure decrease, which were caused by polymerization. Subsequently, 2,072 g of propylene oxide was added in a continuous manner. In this step, it was hard to control the reactor temperature to 135° C. without full cooling of the reactor jacket due to intensive heat generation. As a result of such polymerization, polyalkylene oxides having an Mn of 15,200 and an Mw/Mn of 1.14 were produced.

Comparative Example 1

The batch reaction was performed in the same manner as in Example 2, except that the amount of tetrahydrofuran was changed. That is, 0.9 g of dipropylene glycol (Mn: 134), 11 g of tetrahydrofuran, and 0.25 g of zinc hexacyanocobaltate complex dispersed in a portion of the tetrahydrofuran were charged in a 3-L autoclave made of stainless steel. An amount of 3.3 g of propylene oxide was further added thereto, and the mixture was heated so that the batch reaction was performed at 90° C. However, an apparent temperature increase and pressure decrease caused by polymerization were not observed. The organic solvent tetrahydrofuran and unreacted propylene oxide were recovered under reduced pressure.

Comparative Example 2

An amount of 22.4 g of dipropylene glycol (Mn: 134), 0.64 g of zinc hexacyanocobaltate complex, and 4.5 g of propylene oxide were charged in a 3-L autoclave made of stainless steel. The mixture was heated so that the batch reaction was performed at 90° C. However, an apparent temperature increase and pressure decrease caused by polymerization were not observed. Unreacted propylene oxide was recovered under reduced pressure.

Comparative Example 3

An amount of 22.4 g of dipropylene glycol (Mn: 134), 50 g of tetrahydrofuran, and 0.64 g of zinc hexacyanocobaltate complex dispersed in a portion of the tetrahydrofuran were charged in a 3-L autoclave made of stainless steel. An amount of 11.7 g of propylene oxide was further added thereto, and the mixture was heated so that the batch reaction was performed at 90° C. However, an apparent temperature increase and pressure decrease caused by polymerization were not observed. The organic solvent tetrahydrofuran and unreacted propylene oxide were recovered under reduced pressure.

The results of Examples and Comparative Examples are compiled in Table 1. The batch reaction did not sufficiently proceed, and unreacted propylene oxide was recovered in all of Comparative Example 1 in which the amount of the organic solvent was small although the amount of the initiator (portion-by-portion addition) added at the start of the reaction was small like in Example 2, Comparative Example 2 in which the initiator was charged all at once and the organic solvent was not used, and Comparative Example 3 in which the amount of the organic solvent was small. In contrast, the reaction smoothly proceeded without problems in temperature control in Examples 1 to 3. However, in Example 4 in which the amount of propylene oxide supplied before the second addition of the initiator was small, heat generated by polymerization was not effectively removed because the amount of the mixture in the reactor was small in the step of continuously supplying propylene oxide. Therefore, Example 4 required full cooling of the jacket. This process will need, for example, any large-scale cooling system and require high production cost when applied for industrial production.

TABLE 1

| | Example 1 | Example 2 | Example 3 | Example 4 | Comparative Example 1 | Comparative Example 2 | Comparative Example 3 |
|---|---|---|---|---|---|---|---|
| Amount of organic solvent in batch reaction at start of reaction (part(s) to alkylene oxide) | 1,030 | 970 | 1,000 | 1,430 | 333 | 0 | 430 |
| Proportion of initiator used in batch reaction at start of reaction (wt %) | 8 | 4 | 9 | 50 | (4) | 100 | 100 |
| Concentration of catalyst in batch reaction at start of reaction (ppm) | 2,950 | 7,040 | 3,680 | 2,840 | 16,400 | 23,800 | 7,610 |
| Amount of organic solvent in batch reaction at start of reaction (part(s) to initiator) | 3,080 | 3,540 | 3,040 | 1,790 | 1,222 | 0 | 220 |
| Amount of alkylene oxide supplied before second addition of initiator (mol eq. to initiator) | 186 | 216 | 446 | 3 | 8.5 | 0.5 | 1.2 |

INDUSTRIAL APPLICABILITY

Polyalkylene oxides having an active hydrogen group produced by the method of the present invention are particularly useful as raw materials for elastic sealants and adhesives and can be used for sealants and adhesives of buildings, ships, automobiles, roads and the like. Particularly, they are useful as raw materials for construction sealants, which are required not to cause stains in a paint coated thereon, and not to cause stains around a joint, and especially are useful as raw material for sealants for siding board joints or sealants for stone joints. For use as adhesives, they can be used as raw materials for common adhesives and contact adhesives. In addition, they are useful as raw materials, for example, for food packaging materials, casting rubber materials, templating materials and paints.

The invention claimed is:

1. A method for producing a polyalkylene oxide, comprising carrying out a ring-opening addition reaction of an alkylene oxide with an initiator having at least one hydroxy group and having a molecular weight of not more than 300 per hydroxy group in the presence of a double metal cyanide complex catalyst in an organic solvent,
wherein the ring-opening addition reaction comprises a batch reaction, which is performed using the organic solvent in an amount from 500 to 1,500 parts by weight relative to 100 parts by weight of the alkylene oxide used at a start of the batch reaction.

2. The method for producing a polyalkylene oxide according to claim 1,
wherein the organic solvent is a polar compound having a non-active hydrogen.

3. The method for producing a polyalkylene oxide according to claim 1 or 2,
wherein the organic solvent is selected from the group consisting of heterocyclic compounds and acyclic ethers.

4. The method for producing a polyalkylene oxide according claim 1 or 2,
wherein the initiator is added in two or more portions, and the batch reaction is performed after every addition of the initiator.

5. The method for producing a polyalkylene oxide according to claim 4,
wherein an amount of the initiator added at a start of a first batch reaction is not more than 20% by weight relative to a total amount of the initiator added in the two or more portions during the ring-opening addition reaction.

6. The method for producing a polyalkylene oxide according to claim 1 or 2,
wherein the catalyst is present at a concentration of not less than 2,000 ppm in the batch reaction at the start of the reaction.

7. The method for producing a polyalkylene oxide according to claim 1 or 2,
wherein the organic solvent is used in an amount of not less than 1,000 parts by weight relative to 100 parts by weight of the initiator used in the batch reaction at the start of the reaction.

8. The method for producing a polyalkylene oxide according to claim 4,
wherein the alkylene oxide is added in an amount not less than 100 mol equivalent to the initiator used in the batch reaction at the start of the reaction and polymerized, and then
an additional portion of the initiator out of the two or more portions is added to a reaction system.

9. The method for producing a polyalkylene oxide according to claim 1 or 2,
wherein after the batch reaction, an adding reaction is performed in which the alkylene oxide is additionally added to a reaction system.

10. The method for producing a polyalkylene oxide according to claim 9,
wherein all rest of the alkylene oxide is additionally added to the reaction system in the adding reaction, after a total amount of the initiator has been batchwise-added.

11. The method for producing a polyalkylene oxide according to claim 1 or 2,
wherein the initiator has a molecular weight of not more than 150 per hydroxy group.

12. The method for producing a polyalkylene oxide according to claim 1 or 2,
wherein the resulting polyalkylene oxide has a number average molecular weight of not less than 10,000.

13. The method for producing a polyalkylene oxide according to claim 1 or 2, wherein the batch reaction is performed using the organic solvent in an amount from 750 to 1,500 parts by weight relative to 100 parts by weight of the alkylene oxide used at the start of the batch reaction.

* * * * *